C. R. WALTER.
IMPLEMENTS FOR SETTING HEDGE PLANTS.
No. 185,602.                  Patented Dec. 19, 1876.
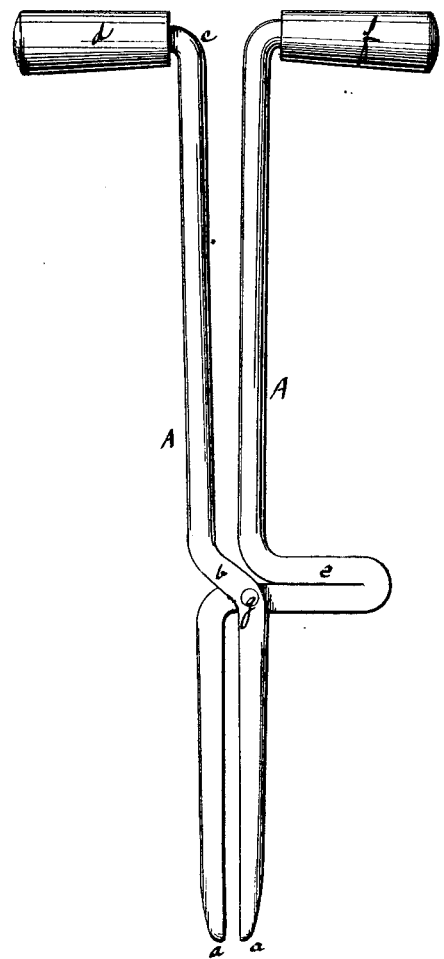
Witnesses:
Clarence Poole
P. K. Evans.
Inventor:
Chas R. Walter
by A. H. Evans & Co
Attys.

UNITED STATES PATENT OFFICE.

CHARLES R. WALTER, OF MOUNT VERNON, OHIO.

IMPROVEMENT IN IMPLEMENTS FOR SETTING HEDGE-PLANTS.

Specification forming part of Letters Patent No. 185,602, dated December 19, 1876; application filed July 1, 1876.

*To all whom it may concern:*

Be it known that I, CHARLES R. WALTER, of Mount Vernon, Ohio, have invented a new and Improved Implement for Setting Hedge-Plants; and I hereby declare the following to be a full, clear, and exact description thereof, reference being had to the accompanying drawings, making part of this specification, in which the figure is a side elevation of the implement.

My invention relates to that class of instruments known as "transplanters;" and it consists of a pair of griping-tongs, so arranged and constructed that the plants can be placed in the ground without digging any holes, as hereinafter more fully set forth and claimed.

In the said drawings, A A′ are two legs or bars, having their lower ends *a a* tapering, and their inner sides flattened or slightly concaved. The leg A has a bend at *b*, and thence is straight to the point *c*, where it is bent at right angles to receive a handle, *d*. The leg A′ is bent at *e*, so as to form a close loop at right angles to the main rod, and at its upper end is bent at right angles in an opposite direction from handle *d*, so as to form handle *f*.

The two legs are crossed and slightly flattened, so as to be pivoted at *g*. The loop *e* serves as a foot-rest to force the ends *a a* into the ground.

The slip or plant to be set is seized between the ends *a a* and the ends inserted in the ground by pressure of the foot on the loop *e*. When deep enough the handles are separated, so as to release the plant, and the implement is withdrawn. With this implement the planting of such things as hedge-slips is greatly facilitated.

Having thus described my invention, what I claim as new, and desire to secure by Letters Patent, is—

As a new article of manufacture, a planting implement composed of the leg A, bent at *b*, and provided with a handle, *d*, in combination with a leg, A′, having a foot-piece, loop *e*, and handle *f*, pivoted together at *g*, substantially as set forth.

CHARLES R. WALTER.

Witnesses:
JOHN W. WALTER.
BENJAMIN A. F. GREER.